United States Patent
Higashi

(10) Patent No.: US 7,613,586 B2
(45) Date of Patent: Nov. 3, 2009

(54) THERMAL VACUUM GAUGE

(75) Inventor: Robert E. Higashi, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 75 days.

(21) Appl. No.: 11/623,561

(22) Filed: Jan. 16, 2007

(65) Prior Publication Data

US 2008/0168842 A1 Jul. 17, 2008

(51) Int. Cl.
*G01L 7/00* (2006.01)

(52) U.S. Cl. ..................................... 702/138

(58) Field of Classification Search ............... 702/138; 73/755, 753
See application file for complete search history.

(56) References Cited

U.S. PATENT DOCUMENTS

| | | | |
|---|---|---|---|
| 4,651,564 A | 3/1987 | Johnson et al. | |
| 4,682,503 A | 7/1987 | Higashi et al. | |
| 4,755,669 A | 7/1988 | Grant et al. | |
| 5,079,954 A | 1/1992 | O'Neal, III | |
| 5,187,674 A | 2/1993 | Bonne | |
| 5,356,819 A * | 10/1994 | Ritschel | 436/147 |
| 5,597,957 A * | 1/1997 | Schieferdecker et al. | 73/755 |
| 6,515,482 B2 | 2/2003 | Kawasaki | |
| 6,973,834 B1 * | 12/2005 | Golan | 73/753 |
| 2005/0176179 A1 | 8/2005 | Ikushima et al. | |

FOREIGN PATENT DOCUMENTS

DE 102005020960 B3 * 12/2006

* cited by examiner

*Primary Examiner*—Tung S Lau
*Assistant Examiner*—Xiuquin Sun
(74) *Attorney, Agent, or Firm*—Kris T. Fredrick

(57) ABSTRACT

A system for determining a gas pressure or gauging a vacuum in a hermetically sealed enclosure. One or more heater structures and one or more temperature sensor structures situated on a substrate may be used in conjunction for measuring a thermal conductivity of a gas in the enclosure. Each heater has significant thermal isolation from each sensor structure. Electronics connected to each heater and sensor of their respective structures may provide processing to calculate the pressure or vacuum in the enclosure. The enclosure may contain various electronic components such as bolometers.

6 Claims, 9 Drawing Sheets

THERMAL VACUUM GAUGE

The present invention may be related to U.S. Pat. No. 4,682,503, issued Jul. 28, 1987. U.S. Pat. No. 4,682,503, issued Jul. 28, 1987, is hereby incorporated by reference.

BACKGROUND

The present invention pertains to sensors and particularly pressure-related sensors. More particularly, the invention pertains to vacuum sensors.

SUMMARY

The invention is a thermal vacuum gauge.

DESCRIPTION

Some vacuum gauges may have shortcomings. Integrated vacuum packaged circuits, such as microbolometers (i.e., infrared detectors), may require a good vacuum in order to perform optimally. The vacuum level or magnitude or gas pressure might be determined from the performance of the IR detectors or other circuits in the package, but this may require significant and somewhat burdensome data processing to infer pressure. For instance, Pirani type vacuum detectors (heated wire) might be used, but they often may require considerable data processing to infer ambient pressure. Or such a detector might be carefully built with nearly all of the error sources and deviations be calibrated out. This would mean a large detector with extensive work for calibrating out error sources and deviations.

The present detector, sensor or gauge does not necessarily have a burden to remove large offset information inherent in a Pirani approach, reduce the amount of data processing necessary to quantitatively determine the sensed vacuum level, and yet result in more accurate pressure indications.

To meet a need, the present sensor, rather than measuring a rate of heat loss of an object, as for example which a Pirani gauge might do, may measure transverse heating through an ambient medium. As the medium in a space where the sensor is situated becomes a vacuum, then the transverse heat conduction in that medium may approach zero. Since the thermal conductivity of each gas is different, the gauge should be calibrated for the individual gas being the medium of the conductivity.

The present pressure sensor may be a structure made with the same process used to make a microbolometer but may be composed of a sequence of separate and adjacent alternating microstructures on one substrate rather than one microstructure as the microbolometer. The present structure may have inter-spersed beams alternately among themselves, with beams intended to heat (as heat sources) and other beams to measure temperatures (as sensors). The beams may be physically isolated from each other except that they may be attached to the same substrate. An approach for significantly heating the temperature sensing beams may include thermal conduction through the ambient gas around the structures.

Figure 1:
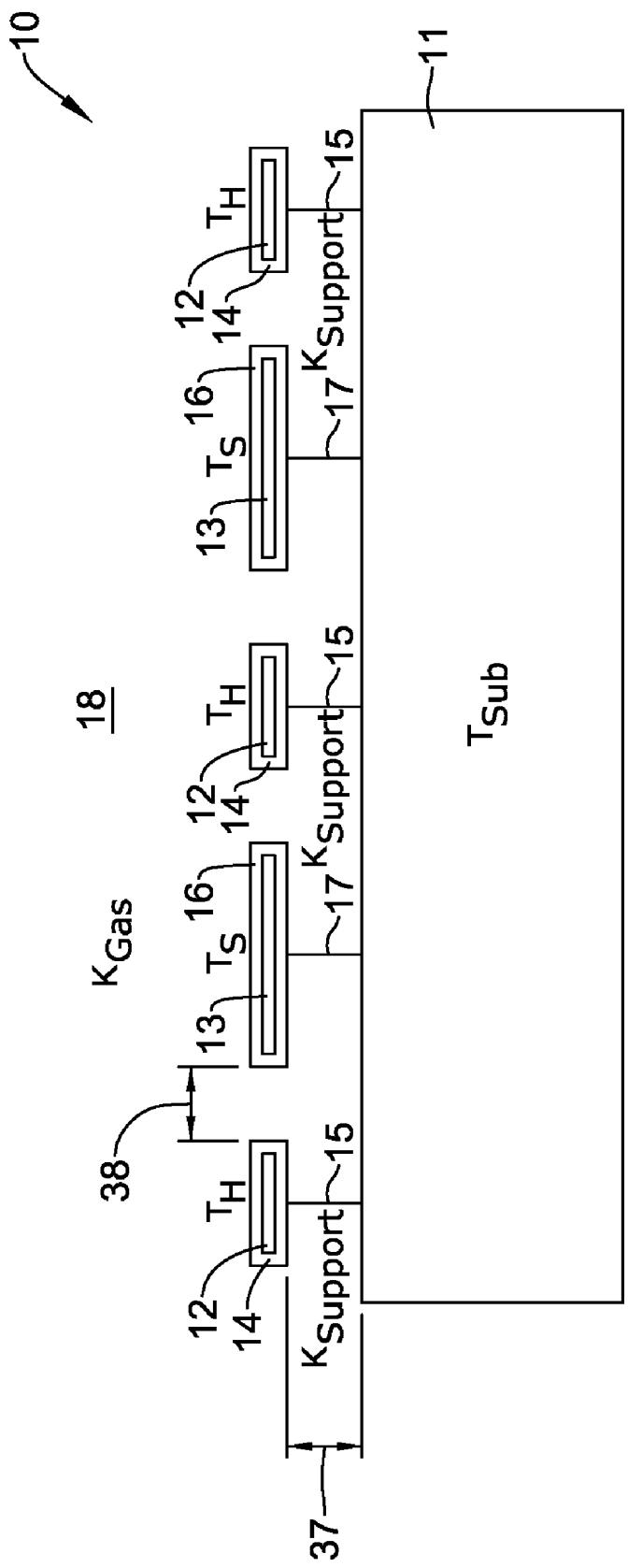
FIG. 1 is a diagram of the present pressure sensor.
Figure 3:
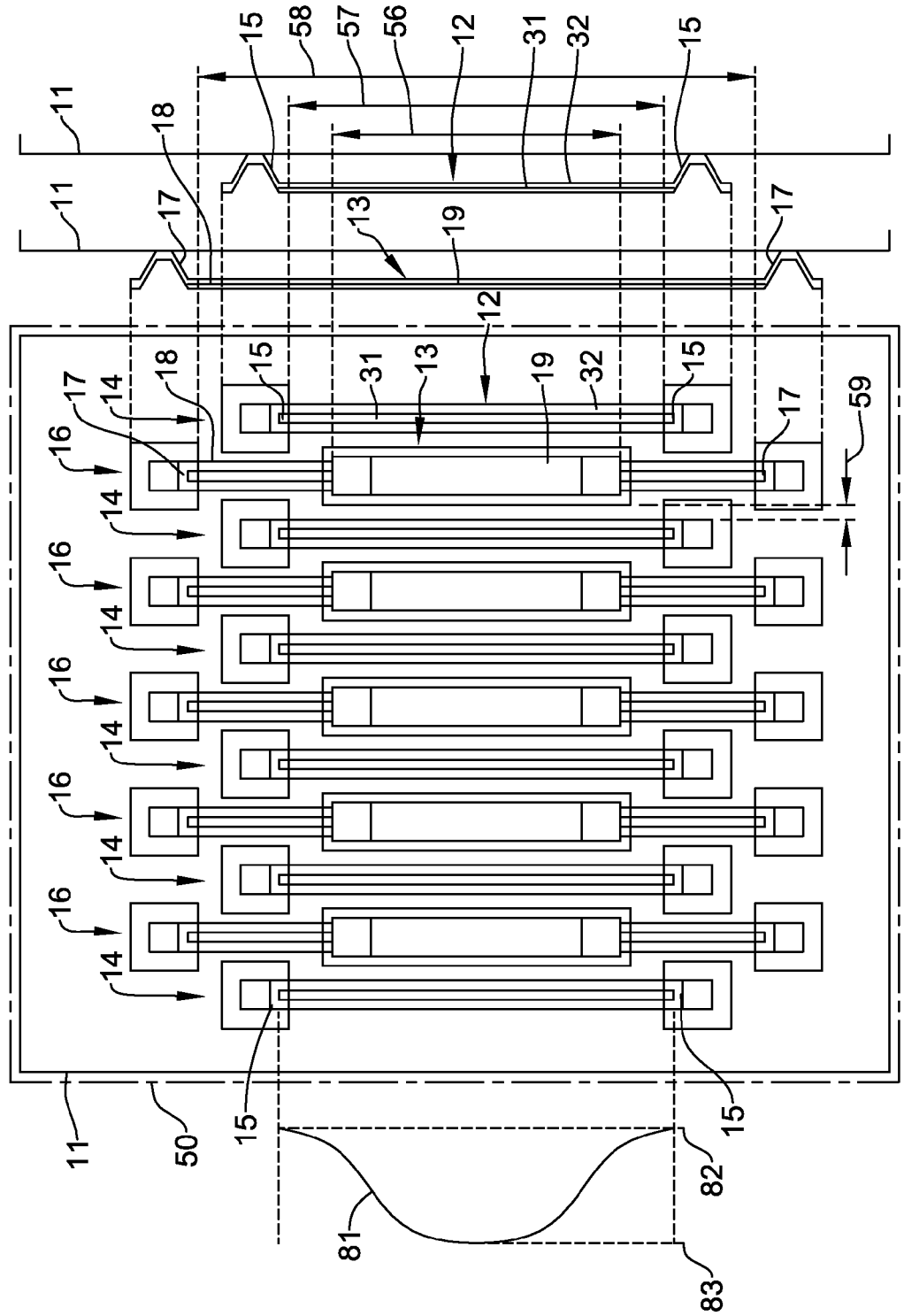
FIG. 3 is a diagram of a top view of the pressure sensor.

The heating and sensing elements or structures of the present sensor may be at such close proximity (e.g., about two microns) in that heat transfer is not dominated by convection but rather by conduction. There may be plurality of heating and sensing structures 14 and 16 in the present system 10 which are interlaced, that is, the heating and sensing structures alternate in their layout on the substrate 11 (FIGS. 1 and 3). The thermal conduction may be from a heating structure to a nearest sensor structure, particularly for higher pressures. However, at lower pressures the mean free path of conduction may be longer, and thus the conduction may be between a heating or heater structure 14 and sensing or sensor structures 16 that are further from or beyond an adjacent sensor structure 16. This conduction path property may indicate that the system 10 has a wide range of sensitivity of magnitudes of pressure, that is, from significant levels of pressure to very low levels.

The heating elements or structures 14 may be, for an illustrative example, about 50 microns long, i.e., about a dimension of a pixel. Other lengths may be appropriate.

The present sensor may relate to products involving integral hermetically sealed vacuum packaged IR devices as a vacuum integrity diagnostic. The sensor may be fabricated with various techniques such as those incorporating MEMS technology.

The pressure sensor may involve having a heater and a temperature sensor being co-located on a thermally isolated structure, having power applied to the structure, and then having the temperature of the structure monitored. There may be other heaters and temperature sensors in the structure. The heaters may be connected in series, parallel, a combination of series and parallel, or other configuration. Similarly, the temperature sensors may be connected in series, parallel, a combination of series and parallel, or other configuration.

Figure 2:
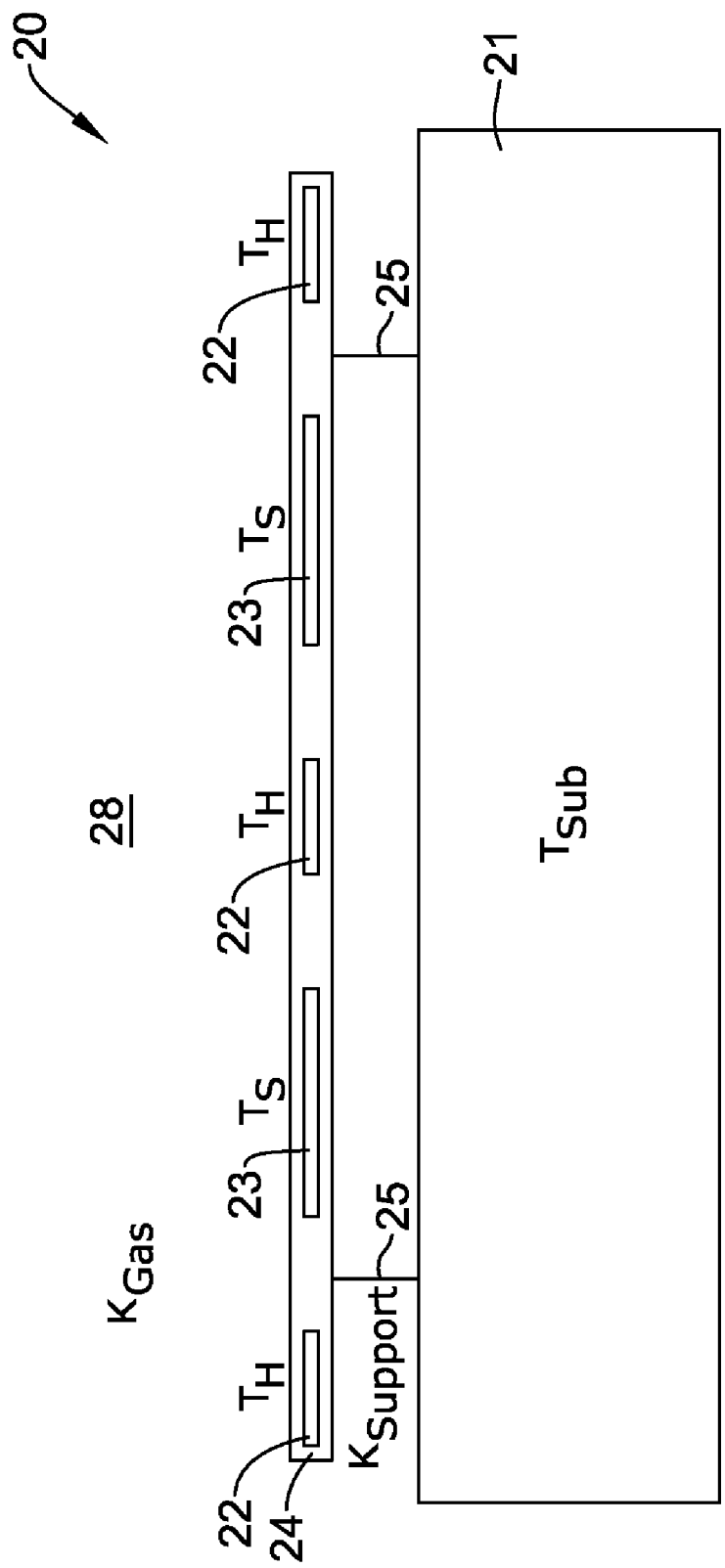
FIG. 2 is a diagram of another kind of pressure sensor having heaters and temperature detectors situated in a same structure.

As an ambient pressure of the gas in the vicinity of the sensor elements is dropped, the thermal conductivity of the gas may drop and more power may be conducted through the support structure rather than through the gas, thus raising the temperature of the structure. FIG. 2 shows a diagram of such pressure sensor 20 and may be used as an example to show short comings of an integrated structure of heaters and sensors for pressure or vacuum.

Figure 5:
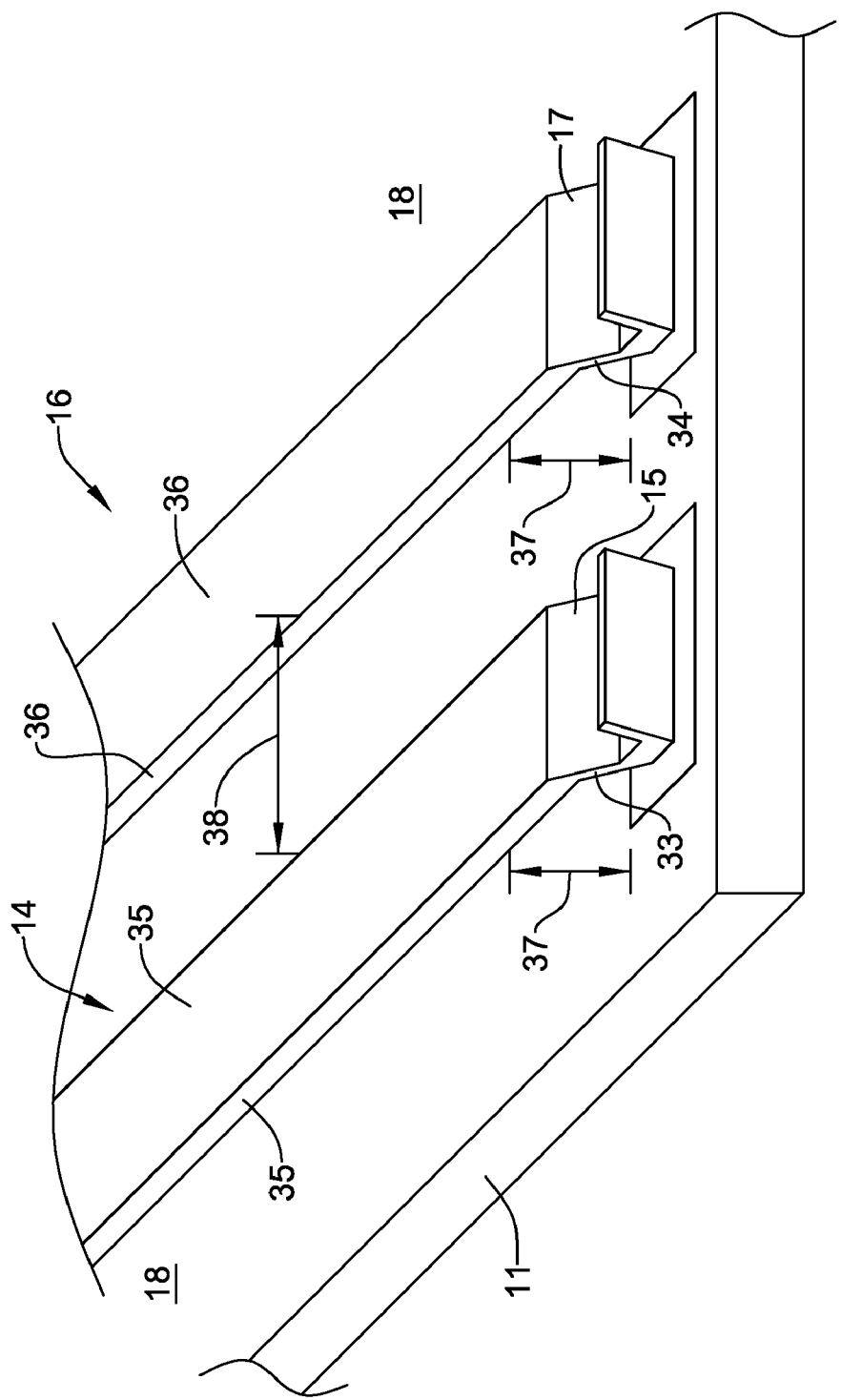
FIG. 5 is a diagram illustrating another instance of support structures for a pair of heating and sensing mechanisms.
Figure 6:
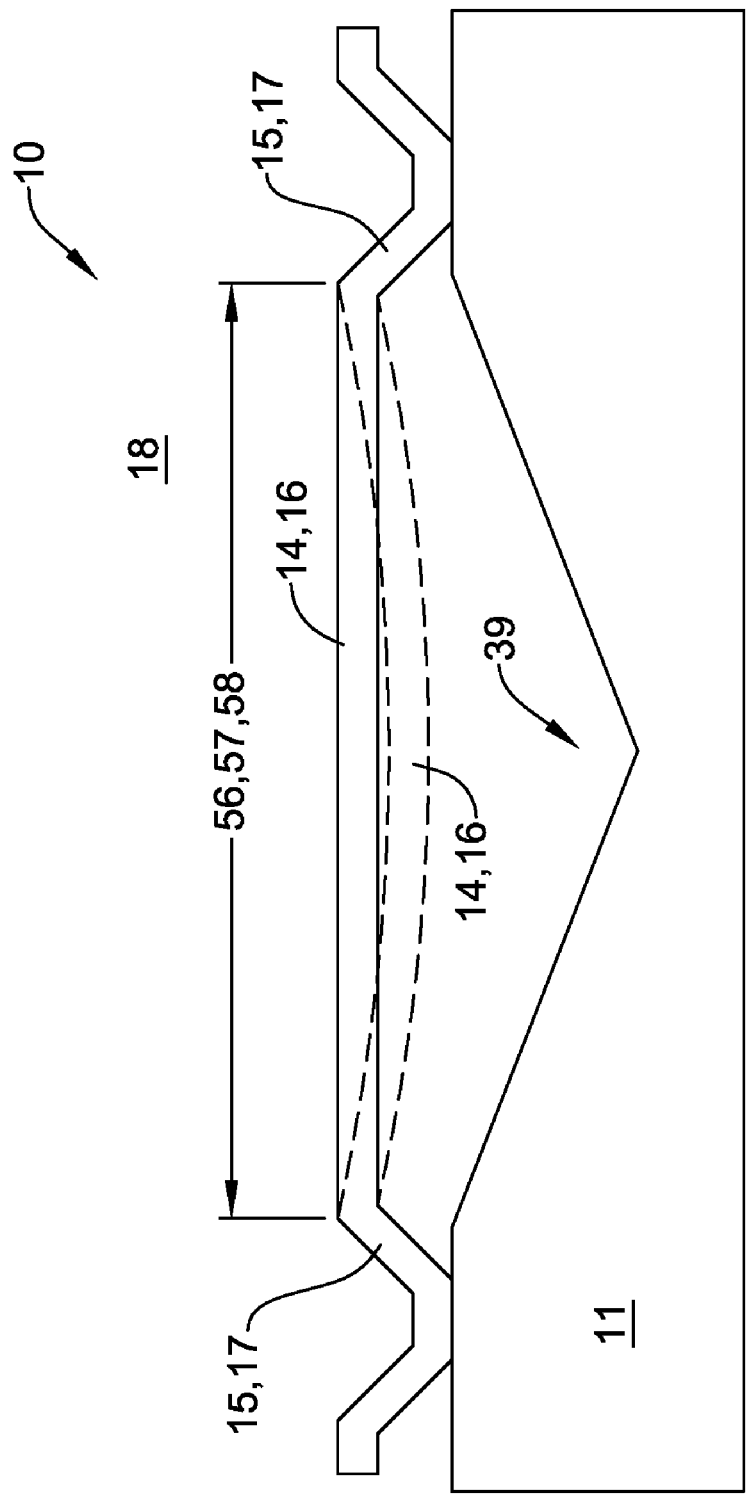
FIG. 6 is a diagram of a heating or sensing mechanism situated on a substrate over a pit in the substrate.

There may be a substrate 21 at a temperature $T_{Sub}$. There may be heaters 22 and temperature sensors 23 co-located in the same structure 24. The temperature of a heater 22 may be designated by $T_H$ and the temperature detected by the sensor 23 may be designated by $T_S$. $T_S$ may indicate an approximate temperature of structure 24. Support structures 25, represented by lines in the Figure for illustrative purposes but do not necessarily show an accurate depiction of the physical relationship of the support structure and the heaters and sensors. The representative illustrations of the physical relationships are shown in FIGS. 3, 5 and 6, particularly relative to similar structures of sensor 10.

Structures 25 may hold structure 24 at its ends relative to substrate 21, and effectively thermally isolate structure 24 from structure or substrate 21. The support structures 25 may have a thermal conductivity constant of $K_{support}$ with an ambient gas 28 about the structure 24, supports 25 and substrate 21. Gas 28 may have thermal conductivity constant $K_{gas}$. $A_{support}$ may be the cross-section area of the material (i.e., support structure 25) between the components (i.e., heaters 22 and sensors 23) and substrate 21 (i.e., heat sink). $A_{gas}$ may be the surface area of the components (heaters and sensors) exposed to the surrounding gas 28, respectively. These parameters and/or properties may used to determine thermal impedance. A significant amount of heat may be conducted from the heaters 22 to sensors 23 via the common structure 24 rather than gas 28. Thus, a reasonably dependable and/or accurate measurement of the amount of gas 28 and/or vacuum in the ambient space of the components in sensor 20 may not necessarily be accurate or arguably even feasible.

However, the behavior of pressure sensor 20 may be roughly described by a formula where $T_s$-$T_{sub}$ is proportional to power divided by a sum of the products $K_{support}$ times $A_{support}$ and $K_{gas}$ times $A_{gas}$, as indicated by the following formula.

$$T_S = T_{Sub} \propto \frac{P_{heat}}{K_{support} * A_{support} + K_{gas} * A_{gas}}$$

$A_{support}$ may represent the wire cross-section of the supporting structures 25 and $A_{gas}$ may represent the surface of the structure 24 exposed to the gas. $P_{heat}$ may represent power to the heaters 22. In the approach (i.e., sensor 20) shown herein, the temperature of the sensors 23 may increase in a complex reciprocal sum relationship with two heat transfer mechanisms.

A configuration 10, as illustrated as shown by a diagram in FIG. 1, may overcome the shortcomings of sensor 20 and provide a reasonably dependable and/or accurate measurement of the amount of gas and/or vacuum in the ambient space of the components. Configuration or pressure sensor 10 may involve heating a microstructure 14 with a heater 12 attached to or embedded in the structure 14. Microstructure 16 having a thermal sensor 13 attached to or embedded in structure 16 may be adjacent to but at a spatial distance relative to microstructure 14 with a gas 18 in the ambient space between structures 14 and 16. Structures 14 and 16 may be situated physically unconnected (except via a physical but thermally negligible connections of support structures 15, 17 and the substrate 11). However, there may a thermal connection between the heater structures 14 and temperature sensor structures 16 via gas 18. The extent of the thermal connection may be measured. The components 14 and 16 having or containing the heating and sensing elements 12 and 13, respectively, may be situated in a common ambient environment of the gas 18.

Figure 4:
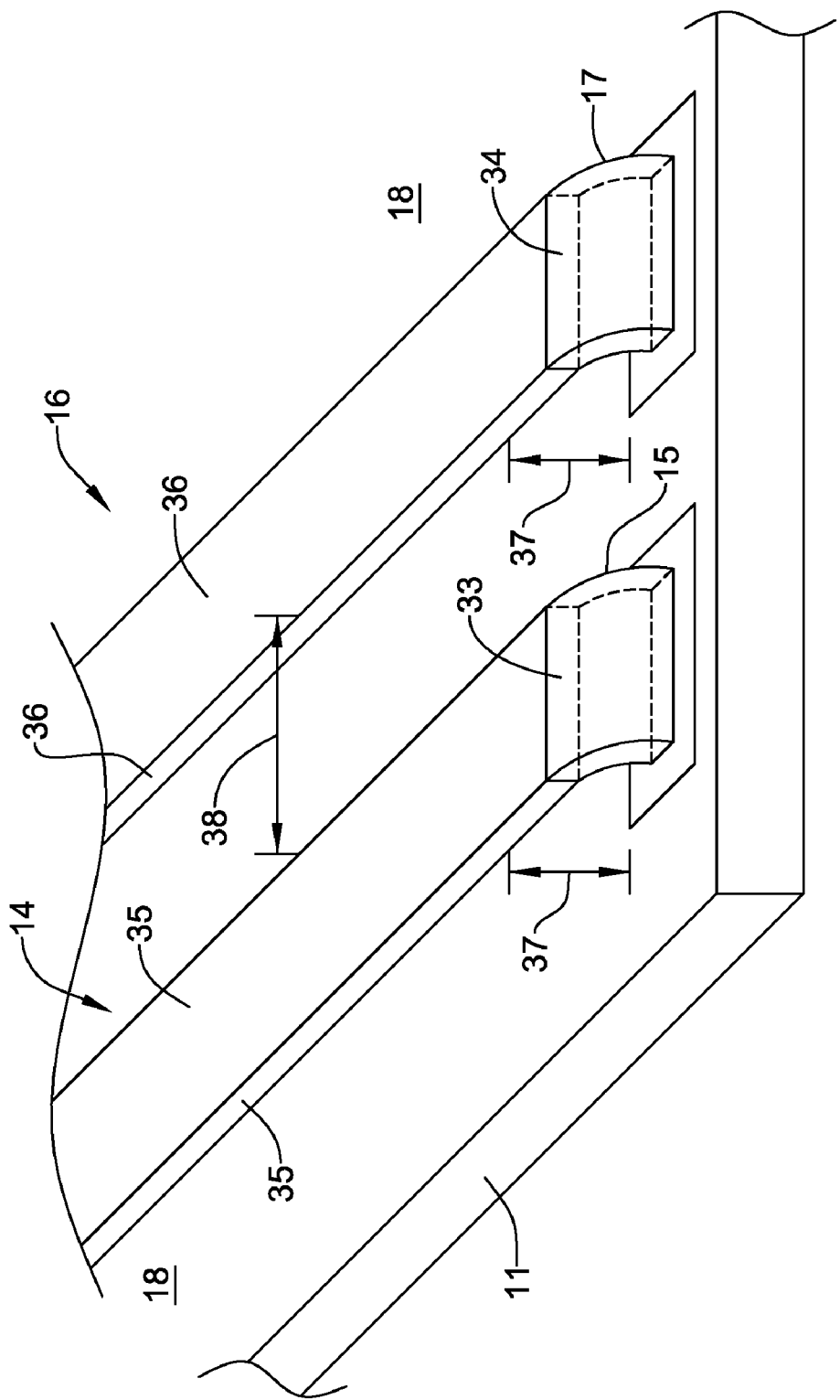
FIG. 4 is a diagram of a pair of heating and sensing mechanisms for the pressure sensor illustrating cross-sections of support structures.

Support structures 15 and 17 may be attached to structures 14 and 16, respectively, for holding and effectively providing significant thermal isolation between the structures 14 and 16 via substrate 11 and consequently between heater 12 and sensor 13. However, the proportion of heat conducted via support structures 15 and 17 to the substrate 11 relative to that of heat conducted among the heating structures 14 and sensing structures 16 may increase as the amount of ambient gas 18 in the enclosure of sensor 10 becomes rather small. Support structures 15 and 17 may be structurally connected to the substrate 11 for physical placement support. Support structures 15 and 17 may be hold the heating and sensing structures at a certain distance 37 from the substrate 11 and a certain distance 38 apart from each other (FIGS. 4 and 5).

$T_{Sub}$ may designate the temperature of the substrate 11 which may generally be the ambient temperature of the structures 14, 15, 16 and 17, particularly in an inactive state. $T_{Sub}$ may be regarded as a starting temperature or reference temperature for the sensor 10 and its structures and/or associated electronics. For calculation purposes, $K_{support15}$ and $K_{support17}$ may designate the thermal conductivity of support structures 15 and 17, respectively.

Microstructure 16 may have the temperature sensing element or sensor 13 attached to or embedded in the structure 16. Temperature sensor 13 may be used to determine and monitor temperature $T_S$ and consequently, with certain known factors, heat transfer through gas 18 from heated microstructure 14 to the temperature sensing microstructure 16. As the pressure drops, the thermal conduction ($K_{gas}$*A) of the gas 18 may drop, since there is less gas per unit volume, and the temperature rise indicated by the temperature sensor 13 may cease and the temperature may even decrease if the heater 12 output is not increased.

$T_S$-$T_{Sub}$ of sensing microstructure 16 may be proportional or approximately equal to a product of a first product that is a product of $K_{gas}$ times $A_{gas2}$ times a constant $C_{config}$ (representative of the sensor configuration and/or shape factor) divided by $K_{support}$ times $A_{support}$ plus $K_{gas}$ times $A_{gas2}$, and a second product that is power divided by a product of $K_{support}$ times $A_{support}$ plus $K_{gas}$ times $A_{gas1}$. Various formulas may provide approximations of the behavior and operation of sensor 10. An operation of the present pressure sensor 10 may be approximately described in an illustrative instance (as noted herein) where the temperature of structure 16 is indicated by the following formula.

$$T_S - T_{Sub} \approx \frac{K_{gas} * A_{gas2} * C_{config}}{K_{support} * A_{support17} + K_{gas} * A_{gas2}} * \left( \frac{P_{heat}}{K_{support} * A_{support15} + K_{gas} * A_{gas1}} \right)$$

"K" may be a thermal conductivity constant in units of (cal/sec)(cm² C/cm) or (W/m K) of a material such as gas 18 in the sensor environment or a material of a support structure 15 or 17. "A" may represent an area of thermal conduction, such as a cross-section 33 or 34 at the support 15 or 17 for the heater or temperature sensor structure 14 or 16, respectively, or a surface 35 or 36 of the structure 14 or 16 that is exposed to the gas 18 (FIGS. 4 and 5). For instance, $A_{support17}$ may be the cross-section 33 of the temperature sensor support 17 which may convey heat in one direction or another relative to an object, such as the substrate 11, to which it is attached. In another instance, $A_{support15}$ may be the cross-section 33 of the heater support 15 which may convey heat in one direction or another relative to the object, such as the substrate 11, which it is attached to.

$A_{gas1}$ may be the surface area 35 of the heater structure 14 that is in contact with the gas 18 in the proximity of the heater structure. $A_{gas2}$ may be the surface area 36 of the sensor structure 16 that is in contact with the gas in the proximity of the sensor structure. $K_{support}$ may be the thermal conductivity constant for heater support 15 and the sensor support 17 if they are made of the same material. $K_{gas}$ may be the thermal conductivity constant of the gas 18 in the environment of the heater and sensor. The $K_{gas}$ may be pressure dependent. For low pressure in the sensor 10, the K may be lower than the K for high pressure gas in the sensor 10. The designation $C_{config}$ may represent a shape and/or configuration factor of the overall pressure sensor or gauge 10 which, among other things, can include that of the heater structure 14, the sensor structure 16, and a volume of the enclosure 50. This term may be obtained with modeling and/or empirical testing of the sensor or gauge 10. The designation $P_{heat}$ may represent the amount of electrical power that is consumed by the heater 15. The potential which may be applied across the heater or heaters 15 may be set or adjusted to be at certain values dependent on other parameters of the sensor 10. The potential may be in the volt range.

A top view diagram of the present pressure sensor or vacuum gauge 10 is shown in FIG. 3. The sensor system 10 may be enclosed in a hermetically sealed enclosure, container or integrated vacuum package 50 that can maintain some level of vacuum or low pressure relative to the atmospheric pressure of an ambient environment or a pressure of some other environment. The enclosure 50 may also include various kinds of electronics such as processors, converters, bolometers, and so forth.

Temperature sensing elements 13 of structures 16 may include, as illustrative examples, 5 μm $VO_x$ resistors 19, as used for bolometers, connected by NiCr wires 18 and suspended above the substrate 11. Heating elements 12 of structures 14 may include, as illustrative examples, 2 μm NiCr wires 31 encapsulated in nitride 32 suspended above silicon substrate 11 in a manner compatible with microbolometers or in a manner as noted herein. The substrate may be silicon. However, other materials and various fabrication techniques may be utilized in making the present sensor 10.

FIG. 3 also illustrates an example of length of some of the structures. The sensing structure 16 may range from about 25 to 100 microns along the length dimension 58. The sensing element 13 may range from 25 to 100 microns along the length dimension 56. In FIG. 3, dimension 56 may be shorter than dimension 58. The heating structure 14 may range from about 25 to 100 microns along the length dimension 57. The heating element 12 may range from about 25 to 100 microns along the length dimension 57; although element 12 may be shorter than its accommodating structure 14. These dimension ranges are merely examples and may be of magnitudes outside of the ranges mentioned herein. The heating structure 14 may have a distance 59 from the sensing structure 16. Distance 59 may have a range of about 0.5 micron to 5 microns; however, the range of distance 56 is merely an example and may be of a magnitude outside of the range mentioned herein.

Heating structure 14, when emanating heat, may have a temperature profile 81 that may begin at support structure 15 with a $T_{sub}$ (substrate temperature) 82, approach a $T_{peak}$ (temperature peak) 83, and end at Tsub at the other support structure 15, or vice versa. Profile 81 is shown in FIG. 3.

FIG. 4 shows a closer look at the structures 14 and 16 and an illustrative example of support structures 15 and 17, respectively. The cross-section areas 33 and 34 of support structures 15 and 17 which may be a basis of some thermal conductivity from the structure 14 to the substrate 11 and from the substrate 11 to the structure 16. If the areas 33 and 34 are not large and the thermal constants of structures 15 and 16 not large, then there may be sufficient thermal isolation of structures 14 and 16 from the substrate 11 for thermal conductivity measurement purposes. In FIG. 4, the areas 33 and 34 of the support structures appear easily identifiable for illustrative purposes. Also, thermal isolation may be assured if the surfaces 35 and 36, respectively, of the structures 14 and 16 are a sufficient distance 37 from the surface of the substrate 11. A primary basis for thermal conduction of heat from the structure 14 to structure 16 may be via the area surfaces 35, the ambient gas 18 and the surfaces 36, in that order.

FIG. 5 shows structures 14 and 16 having a different variation of support structures 15 and 17, respectively, than those in FIG. 4. The structures of FIG. 5 may be an illustrative example. The support structures 15 and 17, as shown in FIG. 4, have a geometry primary for illustrative purposes of their respective areas 33 and 34. The support structures and their base connections to the substrate may of various designs, depending upon their appropriateness for an application of the system 10 at hand.

FIG. 6 shows a configuration of sensor 10 having a pit 39 in the substrate 11 below at least the heater structure 14 for better thermal and physical isolation in the case where extra long structures are used for getting a better area to surface aspect ratio for perhaps improved sensitivity and/or greater measurement ranges of the vacuum gauge or sensor 10. Where a long structure 14 may buckle or sag as shown by a dashed line replication of structure 14, 16, and come closer to the substrate due to heating, the pit 39 may provide an adequate distance between the substrate 11 and the structure 14 to maintain sufficient thermal isolation between them. The pit 39 structure may also be situated below the sensing structure 16 for similar reasons.

The length dimension 56, 57, 58 of FIG. 6 may be as indicated for the dimensions 56, 57 and 58 as noted herein for FIG. 3. The dimension 56, 57, 58 may be other than the ranges mentioned herein. Support structures 15 and 17 may continue to hold the structures 14 and 16, respectively, in their appropriate place in the case of structure 14 and/or structure 16 sagging, buckling, deformation, and/or the like.

One may model the temperature response using various forcing functions (i.e., constant power, constant temperature, constant voltage, and constant current). One may assume that the thermal conductivity (K*A) of the gas is roughly ten times greater than that of the structure at atmospheric pressure. The value of the fraction of the conductivity on the X-axis may vary and then the heat transfer balance may be noted.

Figure 7:
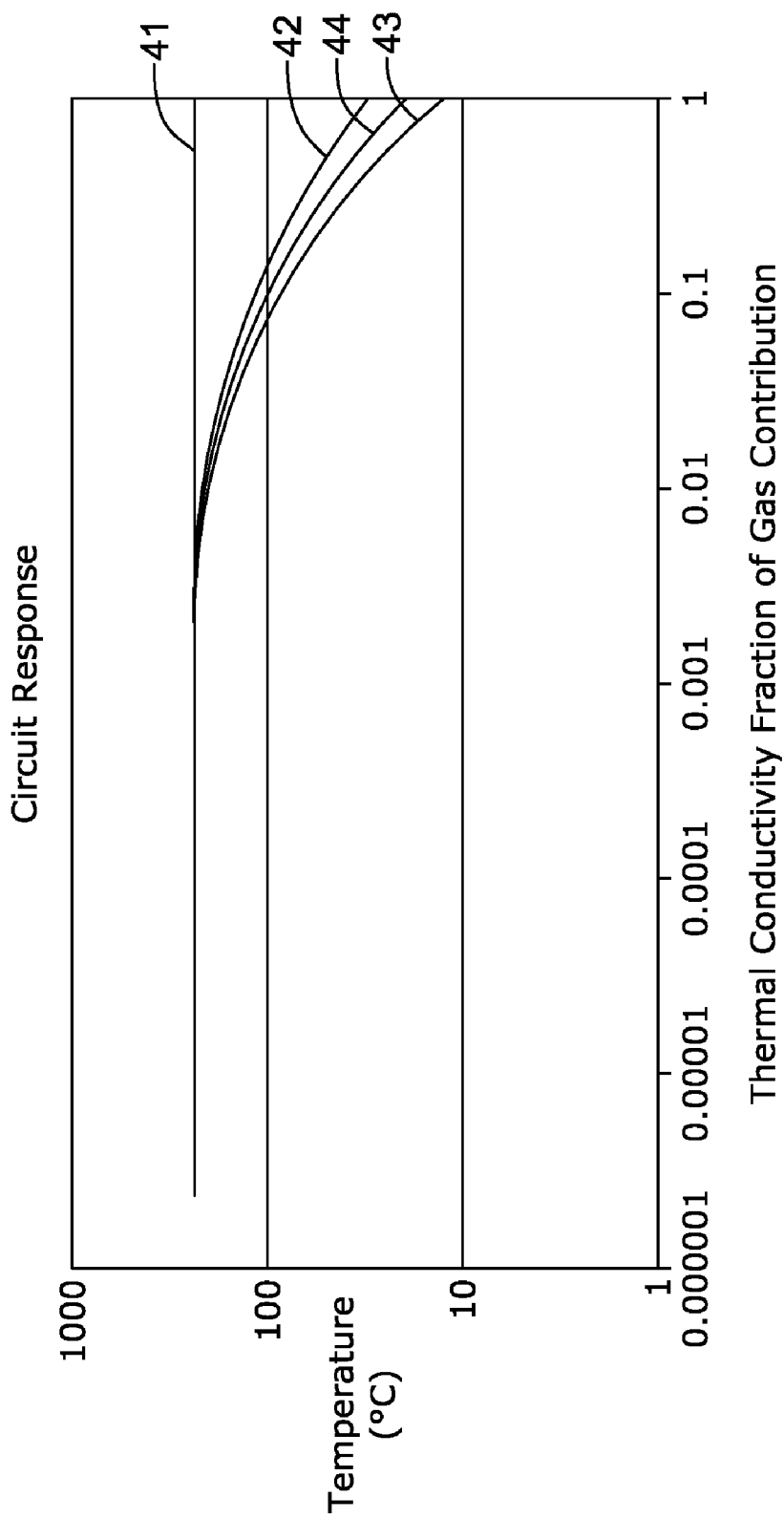
FIG. 7 is a graph of a behavior of the pressure sensor of FIG. 2.

A simulation of the behavior of the sensor 20, having the single structure 24 containing both the heaters 22 and temperature sensors 23, for various operating modes is shown as a circuit response in a graph of FIG. 7. The graph shows temperature versus a thermal conductivity fraction of gas contribution in logarithmic scales. The temperature versus the thermal conductivity fraction of gas contribution is shown with curves 42, 43 and 44 for voltage, current and power, respectively, with the temperature shown by curve 41. One may note that a low pressure response is compressed into a region where one may have to subtract a large offset to get an accurate measurement. This is a disadvantage to actually measuring the pressure, although it may provide somewhat a qualitative measure of a go/no-go determination for vacuum.

Figure 8:
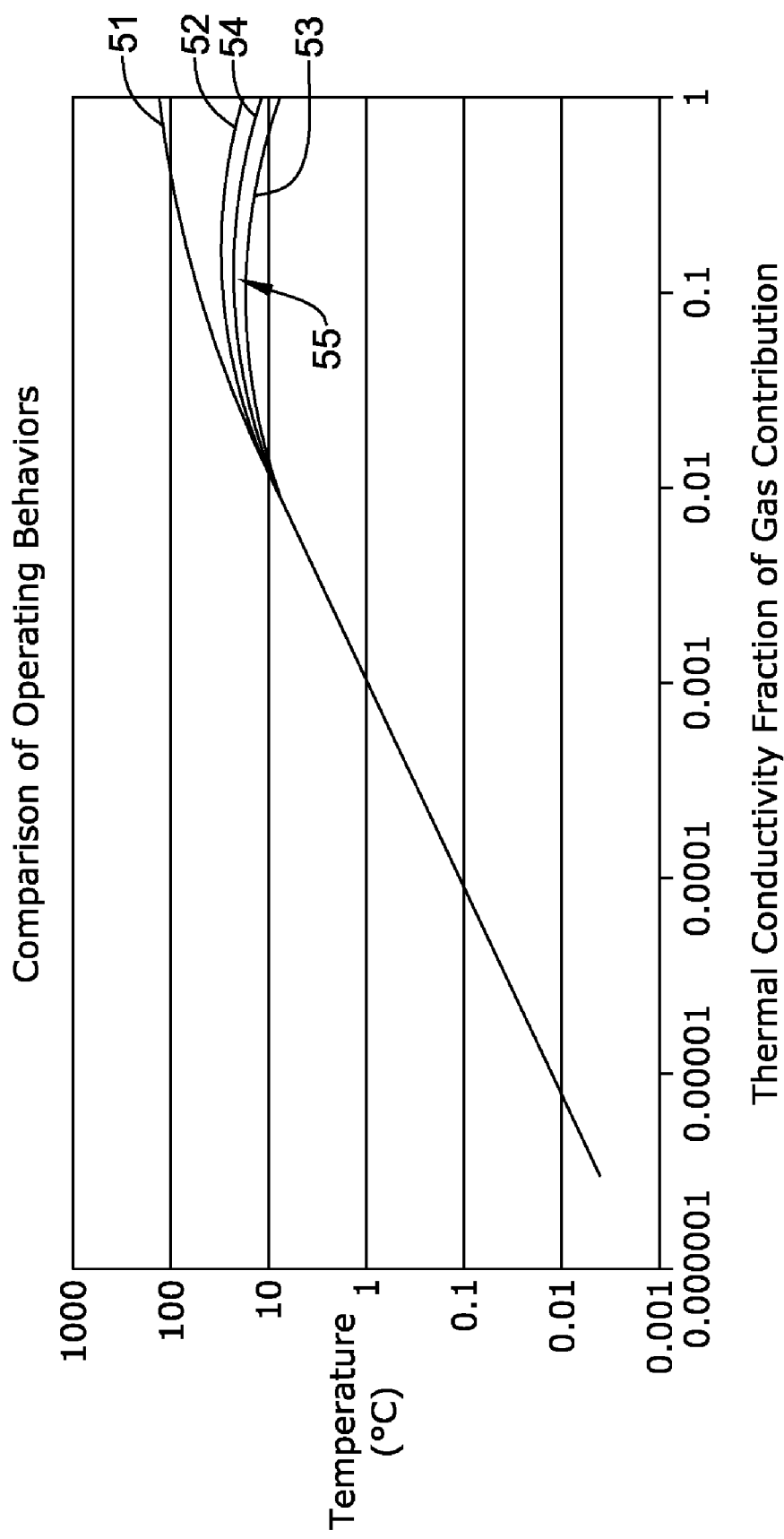
FIG. 8 is a graph of a behavior of the present device for various operating modes.

The graph of FIG. 8 shows a simulation of the behavior of the sensor 10, having the separate structures 13 and 14 for containing heaters 22 and temperature sensors 23, respectively, for running the heater or heaters in various operating modes as a circuit response. The graph shows temperature versus thermal conductivity fraction of gas contribution in logarithmic scales. The temperature versus the thermal conductivity fraction of gas contribution is shown with curves 52, 53 and 54 for voltage, current and power, respectively, with the constant temperature circuit shown by curve 51. At area 55, the gas:solid conduction ratio may be about equal.

In FIG. 8, one may see that the response goes to very low pressures and may depend on null stability of a heat-sunk resistor. There is also a double valued response if the operating mode is something other than at constant temperature. This is because initially as the temperature of the heater goes up with decreasing pressure (with decreasing thermal conductivity), then the temperature field may increase also until the gas conduction becomes low enough to compensate, roughly at the point where the thermal conductivity of the gas equals the thermal conductivity of the support structure.

A good mode of operation may be operating the heater in constant temperature mode, using the voltage to operate the heater as a coarse vacuum monitor (it may be high at high pressure and get smaller at low pressures), and then using a transverse temperature sensor for a low pressure signal.

Figure 9:
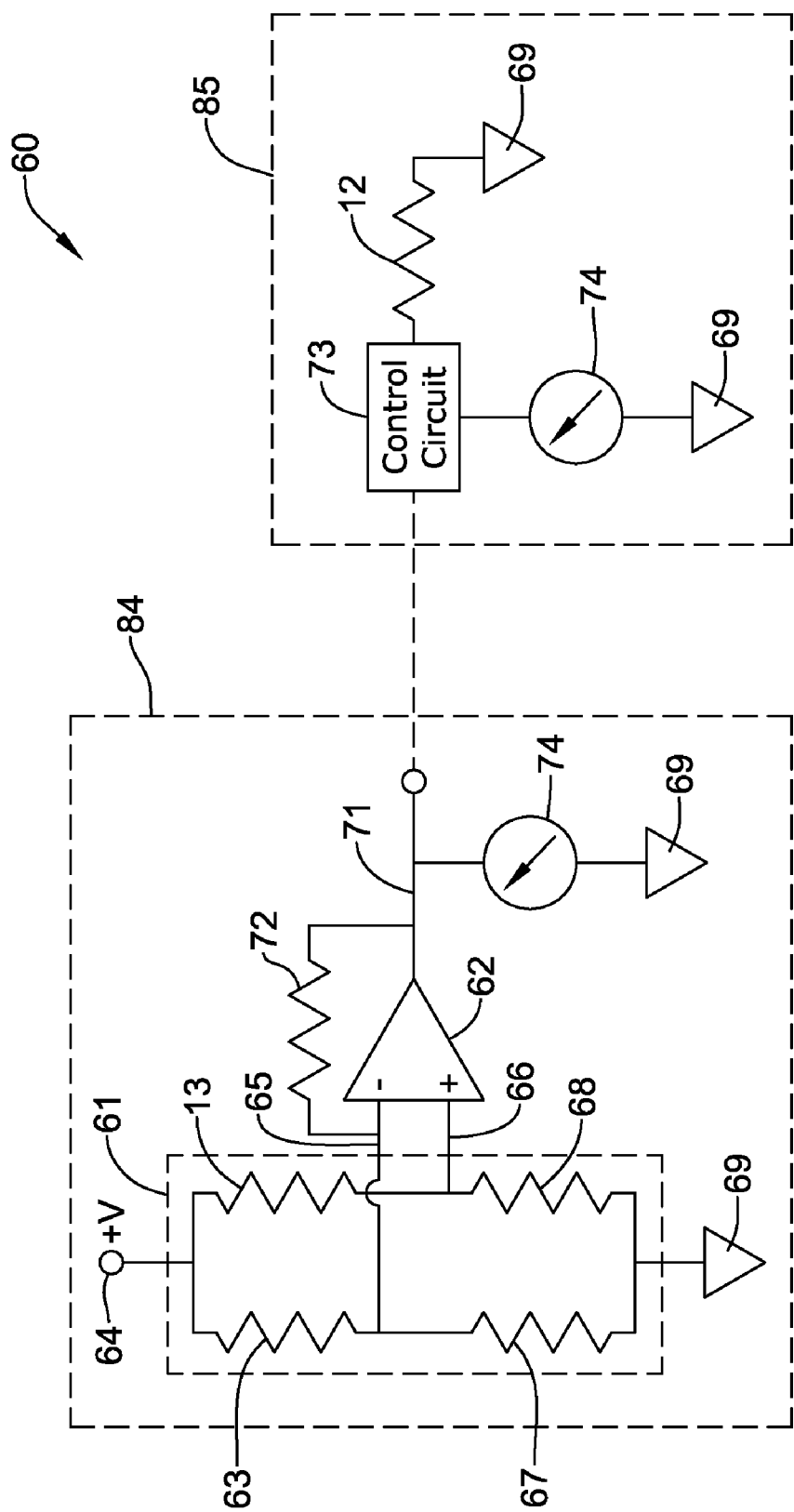
FIG. 9 is a schematic of an illustrative sensing and control electronics circuit for the present pressure sensor or vacuum gauge.

FIG. 9 is a schematic of an illustrative example of sensing and control electronics circuit 60 which may be incorporated as part of the pressure sensor 10. However, other designs and kinds of circuitry may be incorporated. A Wheatstone bridge 61 may be connected to an operational amplifier 62. Bridge 61 may have a reference resistor 63 having one end connected to a positive voltage terminal 64 and the other end connected to an inverting input terminal 65 of the amplifier 62. The reference resistor 63 may have its value selected in accordance with the other parameter values of circuit 60 and the sensor 10. A resistor 13, having a value that varies with temperature change, may have one end connected to a non-inverting input terminal 66 of amplifier 62 and the other end connected to the voltage terminal 64. Resistor 13 may be the temperature detection element situated in or attached to structure 16 of the sensor 10. The selection of reference resistor 63 may depend in part on the resistance value and the TCR of the detector element 13 and the desired dynamics of sensor 10.

There may be two other resistors 67 and 68 in bridge 61. Resistor 67 may have one end connected to the inverting input terminal 65 of amplifier 62 and the other end connected to a reference voltage or ground terminal 69. Resistor 68 may have one end connected to the non-inverting input terminal 66 of amplifier 62 and the other end connected to the ground terminal 69. The values of resistors 67 and 68 may be the same. Their values may set in view of the value of reference resistor 63 and temperature sensor or detector 13.

An output terminal 71 of the amplifier 62 may be connected to one end of a negative feedback resistor 72 which has the other end connected to the inverting input terminal 65 of the amplifier. The value of resistor 72 may set according a desired gain of the amplifier 62 in view the other components of circuit 60 and sensor 10.

The output terminal 71 of the sensing mechanism 84 may be connected to an input of a control circuit 73 of a heater 12 control mechanism 85. Or the output terminal 71 might not be connected to mechanism 85. Mechanisms 84 and 85 may be independent of each other.

Circuit 73 may be designed to suit a desired mode of operation of the sensor 10. An output of circuit 73 may be connected to one end the heating element 12 of the structure 14 of the sensor 10. The other end of element 12 may be connected to the ground terminal 69. Other configurations or variations of circuit 60, including control circuit 73, may be implemented so as to effect certain purposes of the sensor 10. Power for the heater 12 may be provided by circuit 73 to maintain a constant temperature, or it may be provided in terms of a constant voltage, current or power. Selection or taking note of a TCR of one or more components in the present circuit 60 and sensor 10 designs may be significant relative to sensing element 13 and/or heating element 12. The sensing element 13 may be a component other than a temperature sensitive resistance; it may be a thermocouple or some other kind of temperature sensing or indicating element. Likewise, the heating element 12 may be a heating mechanism different than the kind as described herein. Mechanisms 85 and 86 may together or independently have a sensor for determining and/or monitoring the substrate 11 temperature ($T_{sub}$).

A meter 74 may have a terminal connected to the control circuit 73. Another terminal of meter 74 may be connected to the ground terminal 69. The meter 74 may be a voltage type of movement. The meter 74 may be connected to the output of circuit 73 or amplifier 62, or another output of either circuit. Meter 74 may instead be connected so as to monitor current or power to the heater 12. There may be additional meters to monitor the various parameters of the circuit 60 and sensor 10.

Control circuit 73 may have a processor and a user interface for monitoring and controlling various parameters of the present configuration of sensor 10, and of other configurations of the sensor, including those of circuit 60. Control circuit 73 of heating control mechanism 85 might not be, or it may be independent of the sensing mechanism 84. Various modes of control of the sensor 10 may be implemented with specially designed software or even with off-the-shelf (OTS) software. Mechanisms 84 and 85 may have their own independent processing arrangements.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A pressure sensor comprising:

a substrate;

a heating structure situated on the substrate; and a sensing structure proximate to the heating structure and situated on the substrate; and wherein the pressure of an ambient gas is determined by an amount of thermal conduction between the heating structure and the sensing structure; and further comprising:

a heating element situated in the heating structure;

a temperature sensing element situated in the sensing structure; and a sensing and control electronics circuit connected to the temperature sensing element and the heating element; and wherein the sensing and control electronics circuit comprises:

a first resistor having a first end for connection to a source terminal, and having a second end;

a second resistor having a first end connected to the second end of the first resistor, and having a second end for connection to a reference terminal;

a third resistor having a first end connected to a first end of the temperature sensing element and a second end for connection to the reference terminal; and an amplifier having a first input connected to the second end of the first resistor, and a second input connected to the second end of the sensing element, and having an output.

2. The sensor of claim 1, wherein the sensing and control electronics circuit further comprises a control circuit having an input connected to the output of the amplifier and having an output connected to one end of the heating element.

3. The sensor of claim 2, wherein the control circuit comprises:
a processor; and
a user interface connected to the processor.

4. A pressure sensor comprising:
a substrate;
a heating structure situated on the substrate; and
a sensing structure proximate to the heating structure and situated on the substrate; and
wherein the pressure of an ambient gas is determined by an amount of thermal conduction between the heating structure and the sensing structure; and
further comprising:
a first support structure attached to the substrate and to the heating structure; and
a second support structure attached to the substrate and the sensing structure; and
wherein a temperature of the sensing structure minus a substrate temperature is approximately equal to a product of a first product that is a product of an ambient gas thermal conductivity constant times an area of a surface of the sensing structure times a sensor configuration constant divided by a first and second support structure thermal conductivity constant times an area of the second support structure plus the ambient gas thermal conductivity constant times the area of the second support structure, and a second product that is input power to the heating structure divided by a product of first and second support structure thermal conductivity constant times an area of the first support structure plus the ambient gas thermal conductivity constant times an area of the heating structure.

5. A method for measuring a pressure in a volume comprising:
placing a heater in a volume;
placing a temperature sensor proximate to but distinct from the heater in the volume;
providing power to the heater;
turning on the heater to emanate heat in the volume;
attaining a temperature indicating signal from the temperature sensor;
determining a thermal conductivity constant in the volume according to a level of thermal conduction between the heater and the temperature sensor;
determining the pressure in the volume according to the thermal conductivity of a gas in the volume;
situating the heater in a first structure;
situating the temperature sensor in the first structure;
situating a second structure on a substrate; and
situating the first structure on the second structure; and
wherein:

$$T_S - T_{Sub} \propto \frac{P_{heat}}{K_{support} * A_{support} + K_{gas} * A_{gas}};$$

$T_s$ is a temperature detected by the sensor;
$T_{sub}$ is a temperature of the substrate;
$P_{heat}$ is an amount of power to the heater;
$K_{support}$ is a thermal conductivity constant of the second structure;
$A_{support}$ is a cross-section area of the second structure;
$K_{gas}$ is a thermal conductivity constant of the gas in the volume; and
$A_{gas}$ is a surface area of the first structure exposed to the gas.

6. A pressure sensor comprising:
a substrate;
a heating structure situated on the substrate; and
a sensing structure proximate to but distinct from the heating structure and situated on the substrate; and
wherein the pressure of an ambient gas is determined by an amount of thermal conduction between the heating structure and the sensing structure; and
further comprising:
a first support structure attached to the substrate and to the heating structure; and
a second support structure attached to the substrate and the sensing structure; and
wherein:

$$T_S - T_{Sub} \approx \frac{K_{gas} * A_{gas2} * C_{config}}{K_{support} * A_{support17} + K_{gas} * A_{gas2}} * \left( \frac{P_{heat}}{K_{support} * A_{support15} + K_{gas} * A_{gas1}} \right)$$

$T_s$ is a temperature detected by the sensing structure;
$T_{sub}$ is a temperature of the substrate;
$K_{gas}$ is a thermal conductivity constant of the ambient gas;
$A_{gas1}$ is a surface area of the heating structure in contact with the ambient gas;
$A_{gas2}$ is a surface area of the sensing structure in contact with the ambient gas;
$K_{support}$ is a thermal conductivity constant of the first and second support structures;
$C_{config}$ is a configuration factor of the pressure sensor;
$P_{heat}$ is an amount of power consumed by the heating structure;
$A_{support1}$ is a cross section of the first support structure; and
$A_{support2}$ is a cross section of the second support structure.

* * * * *